Figure 7:
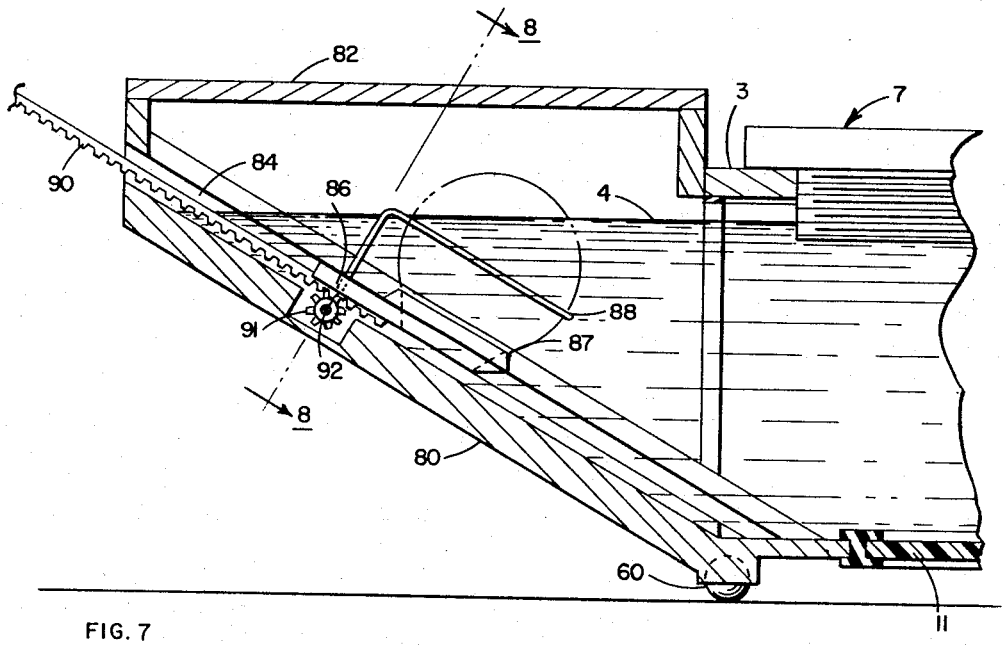

June 27, 1967 G. M. ROBSON 3,328,502
METHOD FOR EMBEDDING OBJECTS FOR VIEWING
Filed Nov. 23, 1962 3 Sheets-Sheet 1
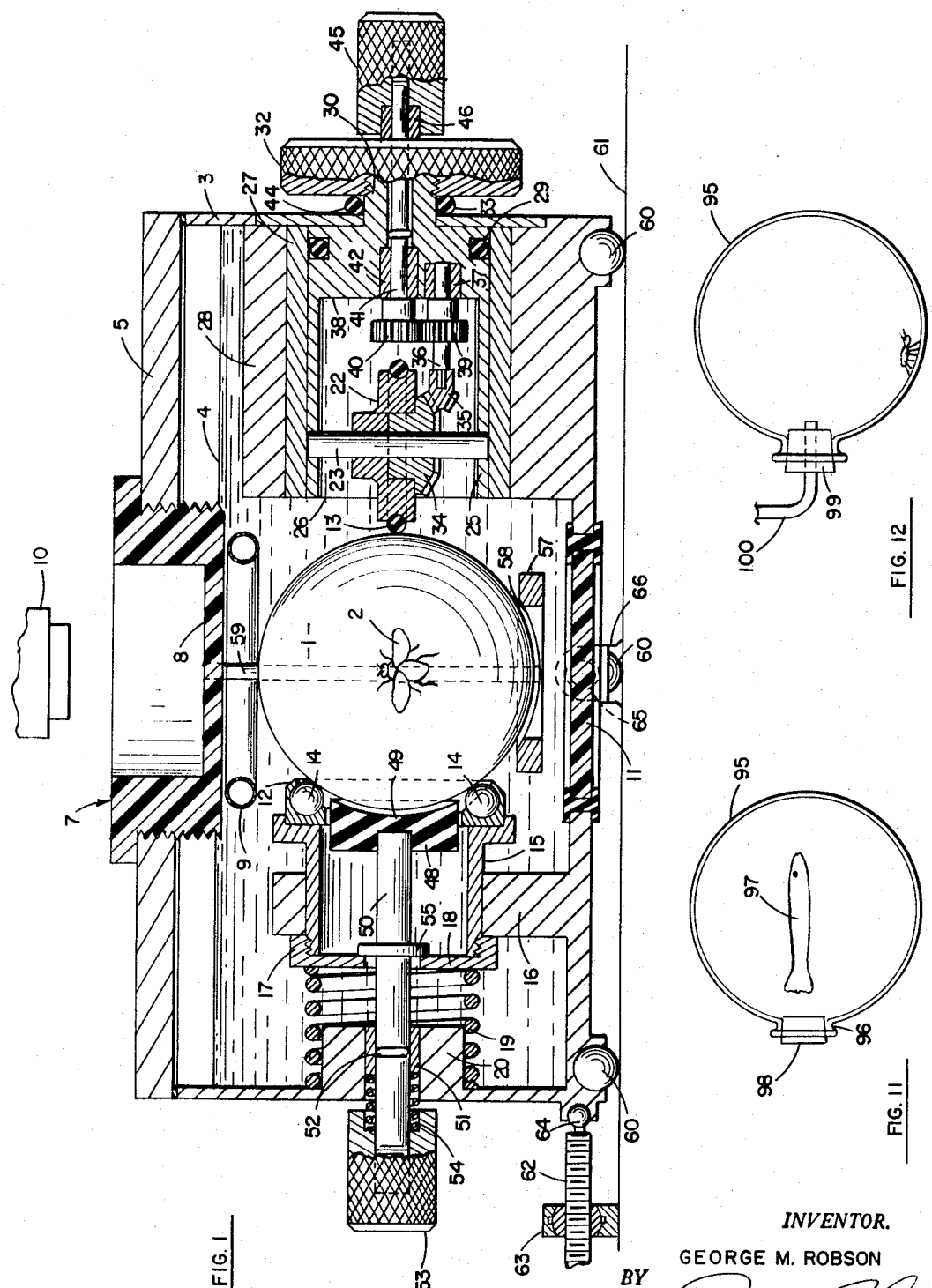
INVENTOR.
GEORGE M. ROBSON
BY
*Richard F. Carr*
ATTORNEY

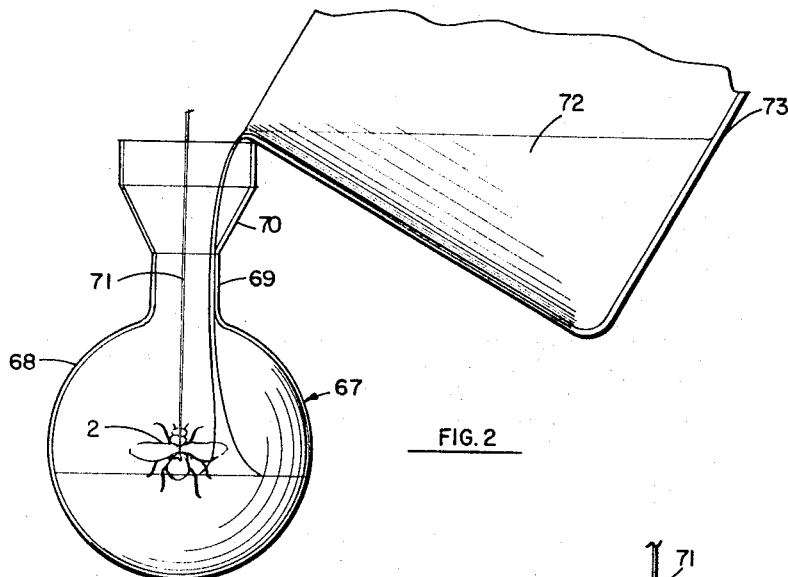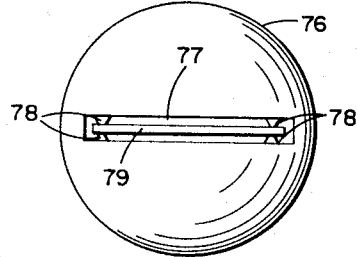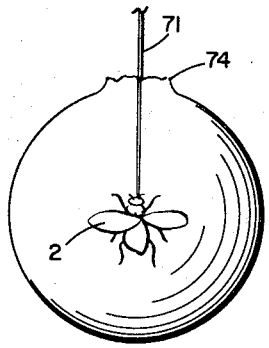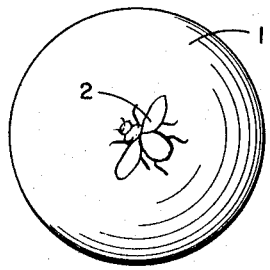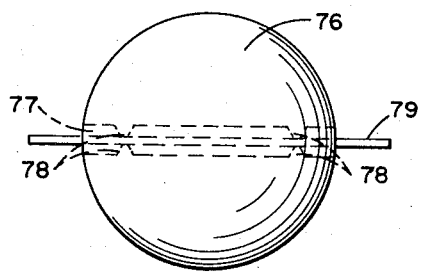

INVENTOR.
GEORGE M. ROBSON
BY
ATTORNEY

United States Patent Office 3,328,502
Patented June 27, 1967

3,328,502
METHOD FOR EMBEDDING OBJECTS FOR VIEWING
George M. Robson, 2158 Live Oak Drive, Los Angeles, Calif. 90028
Filed Nov. 23, 1962, Ser. No. 239,541
2 Claims. (Cl. 264—161)

This invention pertains to an arrangement for obtaining a distortion free view of any object.

Although this invention has wide applicability, one field in which it is particularly useful is zoology. It is common practice, of course, in conducting research to view various kinds of objects under microscopes. In recent times the specimens frequently are preserved and protected by being imbedded in a clear plastic block. These blocks are rectangular in cross section, and constructed by a series of steps in which a quantity of plastic first is poured into a mold, after which the specimen is put in place. Following this there are additional pourings of plastic to complete the block. While these plastic blocks effectively preserve the specimen, there is inherently considerable distortion in viewing of the object contained therein. Only when looking directly at the specimen substantially normal to one of the principal flat surfaces of the block can a reasonably accurate view be obtained. It is not practical to move these blocks about and view the specimen from various angles because of the distortion arising from angular movement of the block of plastic. Furthermore, the discontinuous pour used in forming the block results in lines of demarcation along the sides, aggravating the distortion obtained.

According to the provisions of this invention, however, a specimen is retained within a perfect sphere of clear plastic. The sphere is immersed in a fluid having the same index of refraction as that of the plastic sphere. A view window engages the fluid providing observation of the specimen within the sphere without any distortion. Provisions are included to illuminate the specimen within the sphere, while the sphere may be rotated in any direction allowing all portions of the specimen to be scrutinized as desired. An arrangement also may be included to permit horizontal movement of the sphere so that under high powered magnification it is possible to view any portion of the object under examination. The specimen is retained within the sphere of plastic by suspending it on a filament of similar plastic within a frangible mold. The plastic then is poured into the mold at room temperature, and the supporting filament becomes absorbed and no longer is visible. After solidification of the plastic the mold is broken away, and the sphere thus produced requires polishing only at the location of the riser where the pouring takes place. Alternative to the use of a filament, the specimen may float in the liquid plastic and be maintained at the mold center by appropriate rotation of the mold until the plastic hardens.

Accordingly, it is an object of this invention to provide a means for distortion free viewing of an object.

Another object of this invention is to provide an arrangement whereby an object may be protected, yet viewed from any angle or location.

An additional object of this invention is to incase a specimen within a distortion free sphere of clear plastic.

Yet another object of this invention is to provide an arrangement for viewing an object at any angle without obstruction of any sort.

Figure 9:
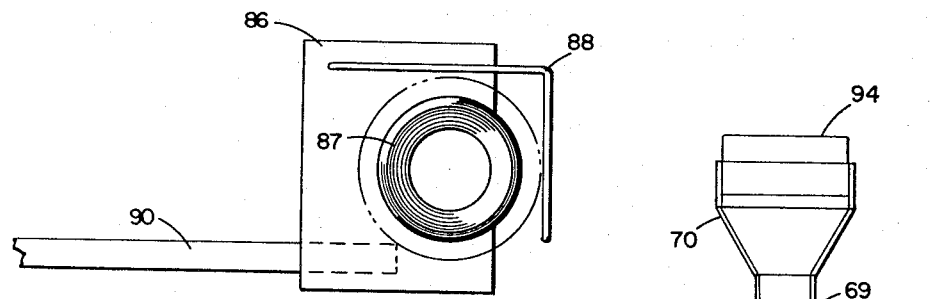
Figure 8:
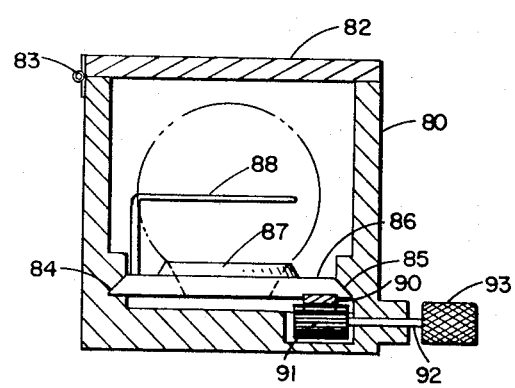
Figure 10:

These and other objects will become apparent from the following detailed description taken in connection with the accompanying drawing in which:

FIG. 1 is a longitudinal sectional view of the arrangement of this invention with a specimen encased in a sphere disposed within the housing, FIG. 2 is an elevational view illustrating one step in the formation of the sphere enclosing a specimen, FIG. 3 is an elevational view of the sphere and the specimen after casting, FIG. 4 is an elevational view of the completed sphere, FIG. 5 is an elevational view of a slotted sphere usable where slides are to be inspected, FIG. 6 is an elevational view of the sphere of FIG. 5 rotated in horizontal plane through 180°, FIG. 7 is a sectional view illustrating an alternate arrangement for introducing the spheres into the housing for viewing, FIG. 8 is a transverse sectional view taken along line 8—8 of FIG. 7, FIG. 9 is a top plan view of the slider used for moving the spheres, FIG. 10 is an elevational view showing formation of the plastic sphere with embedded specimen without the use of a filament for suspending the filament, FIG. 11 is an elevational view of a hollow glass sphere usable for observing living specimens, and FIG. 12 is an elevational view of the glass sphere with added provision for introducing gas into the interior.

In general this invention includes a sphere 1 of a clear plastic material such as polyester resin. This sphere is constructed to have a constant radius and a smooth exterior. Embedded within the sphere is a specimen 2, such as an insect, normally located at the center point of the sphere. A housing 3 is adapted to receive the sphere 1, as well as a quantity of fluid 4 having the same index of refraction as the index of refraction of the plastic used for the sphere. Any liquid will be suitable so long as it is sufficiently clear to allow the specimen to be seen fully, has an appropriate index of refraction, does not react chemically with the plastic sphere, the housing or the rotating mechanism, and does not impede the action of the rotating mechanism by adhesion or gumming. One usable liquid is the same plastic as that of the sphere, uncatalyzed so that it does not solidify too radipdly. However, this will necessitate periodic thorough cleaning of the unit. A mixture of glycerin and water is quite suitable, being relatively inert and having lubricity.

Threadably received in the top 5 for the container 3 is a clear plastic member 7 having a flat viewing window 8 through which the specimen 2 is to be observed. The fluid 4 substantially fills the housing 3 and contacts the surface of window 8. As a result, when observing the object 2 through window 8 and the fluid 4, it may be seen without any distortion. The common index of refraction for the fluid and the plastic sphere assure that the light rays will not become refracted between the sphere and the fluid, so that the distortion-free observation of the object is possible.

Suitable illumination of the object 2 is accomplished by an annular electric lamp 9 positioned near the top of the container 3. Normally the view of the specimen within the container will be obtained by means of a microscope 10 positioned above the viewing window 8. Alternatively, the image of the specimen may be projected on a screen, or other viewing arrangement may be provided.

Preferably an additional window 11 is provided in the lower wall of housing 3 opposite the window 8. Window 11 allows an exterior light source to shine into the housing from below to provide additional illumination of the sphere and its specimen.

In order that the object 2 may be viewed to maximum advantage, there is provided an arrangement to impart universal rotation to the sphere 1 from the exterior of the housing 3. Support for the sphere 1 is provided on one side by a ball bearing 12 and on the other by an annular drive ring 13. The ball bearing 12, having a plurality of exposed balls 14, is supported by one end portion of a short tubular member 15. The latter element is axially slidable relative to the housing within a substantially complementary opening provided in upstanding wall 16 within the housing. The end of member 15 opposite the ball bearing 12 is threaded and receives a ring 17 having a radially inwardly extending flange 18. Spring 19 circumscribes boss 20 formed in the side wall of the housing and engages the radial face of ring 17, thereby biasing member 15 and the ball bearing 12 to the right, as seen in FIG. 1. The movement to the right is limited by the arrangement of the opposite radial face of ring 17 and the side of upstanding wall element 16 of the housing. With the ball bearing 12 biased to the right in this manner, a portion of the sphere 1, which is of greater diameter than bearing 12, is received within the ball bearing, and engaged by the annularly arranged balls 14. The sphere also is maintained in close contact with the drive ring 13. This supports the sphere 1 centrally within the housing beneath window 8.

Drive ring 13 is mounted within an annular groove on a wheel 22 mounted on a shaft 23. The ends of shaft 23 are received within the tubular receptacle portion 25 of a rotatable member 26. This positions shaft 23 in a vertical plane, with its axis at right angles to the axis of member 26. The latter member is received within a sleeve bearing 27, held in turn by a receptacle 28 formed in the right-hand wall of the housing 3. An O-ring 29 effects a seal between the exterior of rotatable member 26 and the inner surface of the sleeve bearing 27.

The right-hand end 30 of member 26 is of reduced diameter and extends outwardly through the wall of the housing. End portion 30 includes screw threads on its exterior surface which engage knob 32. A washer 33 is interposed between the inner face of the knob 32 and the housing exterior.

It is apparent from the foregoing, therefore, that rotation of knob 32 causes like movement of member 26, thereby controlling the angular position of the shaft 23. This movement of the shaft 23 alters the angular relationship of drive ring 13 with respect to the surface of sphere 1. However, the drive ring 13 is located in the plane of the centerpoint of sphere 1, and on the axis of support bearing 12, so that mere rotation of shaft 23 does not cause any movement of the sphere 1.

Rotatably coupled with the wheel 22 is a bevel gear 34, likewise mounted on shaft 23. Gear 34 meshes with bevel gear 35 driven by stub shaft 36 rotatably supported in bearing 37 in the end wall 38 of member 26. Also rotatable with shaft 36 is gear 39 driven by pinion 40. The latter gear is keyed or otherwise made rotatable with drive shaft 41 held within bearing 42 at the axis of the end wall 38 of member 26. The shaft 41 extends outwardly from the bearing 42 through an axial opening in end portion 30 of member 26, being sealed with respect to the inner surface of this opening by means of O-ring 44. The outer end of shaft 41 threadably engages small knob 45. Bearing 46, within knob 45, and around shaft 41, provides a bearing surface between the knobs 45 and 32.

By this arrangement, when knob 45 is rotated shaft 41 also is turned thereby causing pinion 40 to rotate. Wheel 22 is in this manner caused to turn by the gear train provided by gears 39, 35 and 34. Therefore, rotation of knob 45 also effects rotation of drive ring 13. This movement of the drive ring against the surface of sphere 1 causes the sphere to rotate about its centerpoint in a direction determined by the position of the drive ring with respect to the surface of the sphere. The latter relationship is established by the positioning of knob 32, and hence the rotational position of member 26 and the shaft 23. This arrangement, therefore, provides for rotation in any desired direction about an axis falling in the same plane as that of the axes of shaft 23 and member 22.

Rotation about the horizontal axis of the unit is accomplished by means of a cup-like member 48 of leather, rubber or plastic having a surface 49 substantially complementary to the exterior of sphere 1. Cup member 48 is carried by a shaft 50 rotatably supported by bearing 51 within embossment 20 of the housing. O-ring 52 forms a seal between the shaft 50 and the inner surface of bearing 51. The outer end of shaft 52 extends outwardly of the housing and threadably engages a knob 53. The knob 53 is circumferentially recessed around shaft 50 to receive one end portion of a spring 54, the opposite end of which engages the edge of bearing 51. This biases the shaft 50 and the cup member 48 to the left to a normal position, as illustrated, where collar 55 on shaft 50 engages radial flange 18 of member 17. This holds the surface 49 of the cup 48 away from the surface of the sphere 1 so that the movement of the drive ring 13 as described above can take place. However, when it is desired to rotate the sphere 1 about a horizontal axis, the knob 53 is pressed inwardly against the resisting force of spring 54, causing the surface 49 of member 48 to engage the surface of this sphere. Rotation of knob 53 then will cause the sphere to turn about a horizontal axis because of the frictional force between the surface 49 and the sphere.

It is apparent, therefore, that by a combination of the movements provided by the member 48 and the drive ring 13 it is possible to obtain universal rotational movement of the sphere 1. This allows the specimen to be observed at any desired angle through the observation window 8. Despite this rotation of the sphere 1, there is no distortion of the object being scrutinized because the sphere has a constant radius, and by virtue of the presence of the fluid 4 within the housing.

Normally for every housing and rotating mechanism there will be provided a number of spheres containing various different objects to be observed and examined. In installing or removing a sphere, the ball bearing 12 first is moved to the left to disengage the surface of the sphere. This is accomplished by pulling outwardly on the knob 53 causing the collar 55 of the shaft 50 to exert a leftward force on radial flange 18 of member 17. This force, when sufficient in magnitude to overcome the opposing force of spring 19, causes tubular member 15 and the ball bearing to move to the left, freeing the sphere from the holding force by the bearing and the drive ring. The sphere then is permitted to drop onto a plate 57 which has a recess 58 to receive and position the sphere. The plate 57 is supported below the sphere by means of arms which depend downwardly from member 7 on either side of the sphere 1. Then, by unscrewing member 7 from the lid 5 of the container, the ball may be lifted out on plate 57. In the design illustrated it is necessary to remove the light 9 in order to provide clearance for the sphere, but with a light of larger diameter this is unnecessary. With a different sphere then placed on plate 57, and the knob 53 again held in a leftward position, the plate again may be lowered into the container and the member 7 screwed into place. When knob 53 is released, the ball bearing 12 is caused to engage the surface of the new sphere, automatically holding and centering this sphere. Thus it is a simple matter to insert or remove spheres containing objects to be viewed in accordance with this invention.

In addition to the rotational movement of the sphere described above, it is desirable frequently to provide for movement in the horizontal plane if the device is to be used to maximum advantage. This is particularly important where a microscope is employed in observing the object and there is relatively high magnification. Such adjustment will permit the eye of the observer to travel over all portions of the speciment without varying its angular relationship to the viewer.

As a simple means for providing this horizontal movement, the housing may be supported on rotatable balls 60 held in sockets on the lower surface of the housing 3. This positions the housing on flat plate 61 and permits lateral movement in any direction parallel to the plane of the observation window 8. To accomplish this movement a horizontal shaft 62 may be threadably received in an upstanding bracket 63. This shaft includes a ball end 64 received in a complementary recess in the side of the housing. A similar shaft 65 is mounted at right angles to the first in bracket 66, also extending to engage the side of housing 3. By appropriate rotation of the shafts 62 and 65, therefore, the entire housing may be adjusted laterally in any direction an ample amount to permit full observation of the specimen. Spherical bearings 75 in the brackets 63 and 66 permit the necessary pivotal movement. Alternative to this mechanism any conventional mechanical stage may be utilized.

For optimum results in examining a specimen the sphere 1 should be perfectly spherical, having an entirely smooth exterior surface. In constructing such spheres, preferably there is initially provided a mold 67 of a frangible material such as thin glass (see FIG. 2). A glass member of this type may be given a precise shape while being quite inexpensive to produce. Lower portion 68 of the mold 67 is spherical in contour, connecting through neck 69 to upper funnel section 70. The specimen 2 is suitably secured to a filament 71 of the same plastic material to be used in forming the sphere. The exact mode of attachment between the filament 71 and the specimen will vary in accordance with the nature of the specimen, and may be accomplished by simply tying the filament around the specimen or otherwise suitably supporting the specimen by the filament. The specimen then is suspended downwardly through the funnel 70 and the neck 69 into the lower portions 68 of the mold and positioned substantially at the midpoint of the mold. The plastic to be used in forming the sphere is prepared and the catalyst added. A polyester plastic may be used for this purpose, being fluid at room temperature so that as the plastic is formed around the specimen, there will be no heat which could cause damage to the specimen. In the illustration of FIG. 2, the plastic material 72 is contained within a beaker 73 from which it is poured downwardly through the funnel and neck portions of the mold and into the lower portion 68 thereof. The plastic is poured continually in this manner until the sphere is full to the level of the neck 69. The continuous pour assures that there will be no lines of demarcation or distortion in the resulting ball. The filament 71, being of the same composition as the plastic 72 used in the pour, becomes absorbed into the sphere formed within the lower portion 68 of the mold. Hence, the filament disappears from view. In this manner, the specimen 2 is placed within a ball of clear plastic by a continuous pour without any supporting means appearing after the sphere has been formed.

Upon solidification of the plastic within the lower portion 68 of the mold, the mold material is broken away, leaving a ball of plastic substantially as seen in FIG. 3, perfectly spherical in form except for a small projection 74 at the location where the plastic was poured through the funnel and neck 69. Therefore, it is necessary to remove merely this small projecting portion of plastic from the sphere thus formed, followed by polishing only in this localized area. In this manner the sphere 1 of FIG. 3 is produced, having a perfectly smooth exterior for distortion free viewing of the specimen 2.

The sphere is obtained in this manner at a minimum of cost yet with optimum results. This is a considerably improved procedure over the use of mating permanent molds, for example, where there always would be produced a ridge running circumferentially around the sphere at the abutting surfaces of the two segments of the mold. This would require an extensive and costly polishing operation to remove the ridge, resulting in a much more expensive process.

It should be borne in mind that while the sphere 1 with the object 2 embedded therein normally will be received within the container 3 for viewing by a microscope or other suitable means, it also is useful for viewing by the naked eye. The result of the distortion free observation of the object within the sphere while the object is preserved and thoroughly protected is realized whether or not the sphere is examined by means of the arrangement of FIG. 1.

Primarily in the medical field the sphere 76 may be used to advantage in conjunction with slides. This sphere, as illustrated in FIGS. 5 and 6, is provided with a diametrically extending rectangular slot 77 passing through the sphere. Small rubber protuberances 78 are provided at opposed positions near the two ends of the slot 77. A slide 79 may be introduced into the slot 77 where it is gripped by the projections 78.

This sphere may be used as before, being introduced into the housing and rotated by the mechanism therein. Obviously, it does not possess all of the advantages of the complete sphere 1, described above, in that distortions may be present at various angular positions of the slotted unit 76. It is still possible to retain the advantage of a continuous pour, however, machining the slot 77 after the plastic material of the sphere has set up. While this is a relatively expensive operation, only one slotted sphere is needed for an unlimited series of slide mounted specimens, so cost remains a minor consideration. However, this arrangement does permit the slide to be rotated to allow viewing of the specimen in a manner not possible in conventional arrangements where the slide is limited to a horizontal position beneath a microscope. It is possible in this manner to obtain various views of the specimen on the slide which may greatly enhance the utility of it. The slide even can be tilted to where its edge is adjacent the window 7 so that the thickness of the specimen can be observed. The under surface also may be viewed.

The use of the slotted sphere for slides is helpful in the medical science field in studies involving microbiology, bacteriology, cell culture, or the like. It is also effective in clinical medicine in analyzing cell smears and for other purposes.

An alternate arrangement for introducing the spheres into the housing 3 may be seen by reference to FIGS. 7, 8 and 9. This design has the advantage of allowing the spheres to be inserted into and removed from the housing without removal of the observation window 7. This arrangement includes a tubular chute 80 communicating with an opening in one side wall 81 of the housing 3. A lid 82 is hinged at one side 83 to permit access to the interior of the chute. The liquid 4 within the housing extends also into the lower part of the chute 80.

The chute includes a pair of longitudinally extending slots 84 and 85 that define tracks receiving a platform 86. The latter member carries at its forward end and on its upper surface a ring 87. The annular member is of smaller diameter than the sphere 1 or 76 and is adapted to receive and support the sphere. A wire element 88 extends upwardly of the member 86 and forwardly of it to prevent the sphere from rolling off of the support ring 87.

It can be seen, therefore, that by movement of the platform 86 in the tracks 84 and 85, the platform can be introduced into the lower portion of the housing 3 beneath the observation window 7. In that location the sphere may be held between the bearing 12 and the drive ring 13 in the usual manner.

In order to effect the movement of the member 86, it may be provided with a rack 90 on its lower surface. This rack extends longitudinally of the chute. It is engaged by a pinion 91 mounted on shaft 92 that is rotatable from the exterior of this unit by means of a knurled knob 93. Therefore, upon turning of the knob 93 the pinion drives the rack to move the slide 86 either upwardly or downwardly in the chute.

Accordingly, to admit a sphere into the housing the lid 82 is raised and the platform 86 is positioned at the upper end of the chute. The sphere then is placed on the ring 87 and is moved downwardly by the rack and pinion drive to the interior of the housing where the sphere is engaged by the drive mechanism described above. When it is desired to remove the sphere, the shaft 50 is pulled outwardly to release the sphere allowing it to drop back onto the ring 87. The platform 86 then is moved outwardly along the tracks 84 and 85 by means of the rack and pinion drive. The member 86 preferably is moved upwardly to a position where the sphere is brought above the upper surface of the liquid 4 of the housing. This permits the fluid to drain from the surface of the sphere before it is removed from the specimen viewing device.

While this arrangement is slightly more complex than the previously described means for inserting and removing spheres, it saves considerable time in operation and hence is preferred in many instances.

In forming the plastic spheres for specimen viewing, in some instances it is preferred to avoid use of the plastic filament 71 as described above in connection with FIGS. 2, 3 and 4. At times it is difficult to secure the filament to the specimen without damaging the specimen. Also, there are occasions when the filament will not entirely dissolve into the liquid plastic introduced into the mold, and so will remain visible after completion of the sphere. These difficulties are overcome when the technique illustrated in FIG. 10 is followed. In this procedure, the specimen 2 is held at the mold center by any appropriate instrument as the liquid plastic is poured in to fill the mold. After this the instrument is removed leaving the specimen immersed in the plastic with no holding means present. Preferably at this time a stopper 94 is fitted into the entrance to the mold so that the liquid plastic cannot flow out. Then, until the plastic sets up, the mold 67 is rotated manually to keep the specimen at the center point. In view of the somewhat viscous nature of the plastic, and the short period for solidification, this is accomplished readily. If desired, a mild application of heat may be made, such as heating to around 150° F., to accelerate the hardening of the plastic. This small temperature rise will not harm the specimen 2, and comparable heating may be used safely with the previously described sphere forming arrangement.

With the procedure of FIG. 10, as before, the advantage of a continuous pour is retained, with consequent absence of lines of demarcation in the completed sphere. Distortion-free observation of the specimen becomes possible with the resulting product. With no suspension means for the specimen being necessary, virtually all possibility of a damaged specimen or imperfect sphere is eliminated. The use of a glass mold is particularly helpful in utilizing this process, by allowing the specimen to be viewed as it is located in the sphere. This makes it a relatively simple matter to position and keep the specimen at the sphere center.

Where living specimens are to be observed the use of a solid plastic sphere is of course impossible. Such specimens may be studied, however, by using a hollow glass sphere 95 as seen in FIG. 11. This may be of approximately the same size as the plastic spheres, having a small neck 96 that provides an opening through which the specimen may be introduced. For marine specimens 97, the sphere 95 is filled with water and a stopper 98 is used to seal the contents. This permits viewing as before, as movement of the live specimen may be inspected. Some slight care will be required to assure that the neck 96 does not contact the mechanism for supporting and rotating the sphere within the housing 3.

Other types of living specimens simply may be allowed to move or attempt to move along the steep slippery wall of the sphere interior. This will permit microscopic observation of the gyrations of a wide variety of specimen types. It will be necessary to remove the fluid 4 from the housing 3 where the sphere contains only a gas, because otherwise it will not be possible to see through the glass sphere wall.

This embodiment of the invention allows many different experiments to be conducted. For example, gases of different types may be introduced into and removed from a sphere during the time the specimen is under observation. As shown in FIG. 12, the stopper 99 for the sphere is suitably apertured to receive a flexible tube 100. The latter member is used to conduct gases into and out of the sphere. The flexible nature of the tube, which may be for example of plastic or rubber, means that the sphere 95 remains movable within the housing 3 to the extent necessary.

While the invention has been described as applied to zoological and medical fields, it is by no means limited to such use. It is possible to observe almost any kind of specimen in this manner, and the spheres may be adapted for medical, education and ornamental purposes. It is possible, also, to construct the spheres of various dimensions to accommodate objects of different sizes.

The foregoing detailed description is to be clearly understood as given by way of illustration and example only, the spirit and scope of this invention being limited solely by the appended claims.

I claim:
1. The method of preserving an object for observation comprising the steps of
   preparing a spherical mold of frangible material having a relatively small opening in one side thereof,
   securing an object to be preserved to a filament of transparent plastic curable at substantially room temperature,
   suspending said object on said filament within said mold with said filament extending outwardly through said opening,
   then continuously pouring into said mold through said opening a quantity of said plastic until said mold is full,
   then curing said plastic,
   then breaking said mold away from said plastic, and subsequently polishing the plastic at the location where said opening in said mold had been to provide said plastic with a substantially perfect spherical exterior configuration.

2. The method of preserving an object for observation comprising the steps of
   preparing a spherical mold of transparent material having an opening therein,
   positioning an object to be observed within said mold,
   filling said mold by continuously pouring therein a liquid transparent plastic material,
   then curing said plastic to a solid form during said curing imparting rotational movement to said mold for maintaining said object substantially centered with respect to said mold,
   and then removing said mold from around said cured plastic.

References Cited

UNITED STATES PATENTS

| 2,401,760 | 6/1946 | Heyroth | 264—221 |
| 2,643,418 | 6/1953 | Auldridge | 264—271 |
| 2,744,440 | 5/1956 | Robertson et al. | |
| 2,776,596 | 1/1957 | Eigen | 264—271 X |
| 2,947,035 | 8/1960 | Baker | 264—271 |
| 3,014,614 | 12/1961 | Carroll et al. | |
| 3,036,492 | 5/1962 | Rao. | |
| 3,074,112 | 1/1963 | Bobrow | 264—275 X |
| 3,120,029 | 2/1964 | Gingrande et al. | 264—275 X |

OTHER REFERENCES

Rohm E. Haas Company Technical Publication "Embedding Biological Specimens In Acrylic Plastic," August 1957 (pp. 1–5 relied on) 264–271.

Stanley, F. B., Plastics Engineering; October 1951 (pp. 113–121 relied on) 264–271.

ROBERT E. WHITE, *Primary Examiner.*

JEWELL H. PEDERSEN, *Examiner.*

W. L. SIKES, L. S. SQUIRES, R. B. MOFFITT,
*Assistant Examiners.*